United States Patent
Karame

(10) Patent No.: US 11,018,858 B2
(45) Date of Patent: May 25, 2021

(54) METHOD FOR RE-KEYING AN ENCRYPTED DATA FILE

(71) Applicant: NEC Laboratories Europe GmbH, Heidelberg (DE)

(72) Inventor: Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 251 days.

(21) Appl. No.: 15/781,706

(22) PCT Filed: Dec. 8, 2015

(86) PCT No.: PCT/EP2015/079006
§ 371 (c)(1),
(2) Date: Jun. 6, 2018

(87) PCT Pub. No.: WO2017/097344
PCT Pub. Date: Jun. 15, 2017

(65) Prior Publication Data
US 2018/0375652 A1    Dec. 27, 2018

(51) Int. Cl.
*H04L 9/00* (2006.01)
*H04L 9/08* (2006.01)
*G06F 21/60* (2013.01)
*H04L 9/30* (2006.01)

(52) U.S. Cl.
CPC .......... *H04L 9/0891* (2013.01); *G06F 21/602* (2013.01); *H04L 9/0819* (2013.01); *H04L 9/0869* (2013.01); *H04L 9/0877* (2013.01); *H04L 9/0897* (2013.01); *H04L 9/30* (2013.01); *H04L 2209/50* (2013.01)

(58) Field of Classification Search
CPC ..................................................... H04L 9/0891
See application file for complete search history.

(56) References Cited

U.S. PATENT DOCUMENTS 9,336,092 B1 *   5/2016   Li ........................ G06F 21/602
9,887,839 B2 *   2/2018   Fadaie ................. H04L 9/0838
(Continued)

FOREIGN PATENT DOCUMENTS

EP    2472430 A1 *   7/2012   ............. H04L 63/08

OTHER PUBLICATIONS

Frederik Armknecht et al: "Transparent Data Deduplication in the Cloud", Proceedings of the 22$^{nd}$ ACM SIGSAC Conference on Computer and Communications Security, CCS '15, Jan. 1, 2015 (Jan. 1, 2015), pp. 886-900, XP055287325.
(Continued)

*Primary Examiner* — Josnel Jeudy
(74) *Attorney, Agent, or Firm* — Leydig, Voit & Mayer, Ltd.

(57) ABSTRACT

A method for re-keying an encrypted data file, the data file being stored chunkwise on a storage entity (SE), data file chunks being encrypted with a global secret, and the method being performed in a memory available to a computing device, includes partially updating a global secret for encryption data for a data chunk to be re-keyed such that an output of a non-interactive oblivious key exchange is used to identify the private key of the data chunk to be re-keyed with a new private key; and reencrypting the data chunk to be re-keyed with the updated global secret.

15 Claims, 7 Drawing Sheets

(56) References Cited

U.S. PATENT DOCUMENTS

| | | | |
|---|---|---|---|
| 2005/0123142 A1* | 6/2005 | Freeman | H04L 9/0825 |
| | | | 380/277 |
| 2007/0220279 A1* | 9/2007 | Northcutt | H04L 25/03159 |
| | | | 713/193 |
| 2009/0268903 A1 | 10/2009 | Bojinov et al. | |
| 2017/0104745 A1* | 4/2017 | Camenisch | H04L 9/085 |
| 2017/0331800 A1* | 11/2017 | Wood | H04L 63/0464 |
| 2019/0268157 A1* | 8/2019 | Wang | H04L 63/123 |

OTHER PUBLICATIONS

Nathalie Baracaldo et al: "Reconciling End-to-End Confidentiality and Data Reduction in Cloud Storage", Cloud Computing Security, ACM, 2 Penn Plaza, Suite 701 New York NY 10121-0701 USA, Nov. 7, 2014 (Nov. 7, 2014), pp. 21-32, XP058061309.

Watanabe Dai et al: "Key Update Mechanism for Network Storage of Encrypted Data", 2013 IEEE $5^{th}$ International Conference on Cloud Computing Technology and Science, IEEE, vol. 1, Dec. 2, 2013 (Dec. 2, 2013), pp. 493-498, XP032573684.

Mihir Bellare Sriram Keelveedhi University of California et al: "DupLESS: Server-Aided Encryption for Deduplicated Storage", USENIX, Sep. 28, 2013 (Sep. 28, 2013), pp. 1-16, XP061008614.

Storer, Mark W. et al. Secure Data Deduplication, StorageSS'08: Storage Security and Survivability, Oct. 31, 2008, Fairfax, Virginia, USA, ACM, pp. 1-10, XP058183923.

\* cited by examiner

| Client | Gateway |
|---|---|
| Re-keying | |
| $h \leftarrow H^*(f)$ | |
| $m \leftarrow \text{"Re-key"} \| g^h$ | |
| $sig \leftarrow Sign(m)$ | |
| $\xrightarrow{\quad h\|sig \quad}$ | |
| $\hat{h} \leftarrow h \cdot g_1^r$ | |
| | Check correctness of signature |
| | If signature is correct, then proceed to re-key using new randomly generated secret $x_i$. |
| | In the key table, store $x_i$ associated with index $g^h$ |
| Key generation | |
| $h \leftarrow H^*(f)$ | |
| $r \xleftarrow{R} \mathbb{Z}_p$ | |
| $\hat{h} \leftarrow h \cdot g_1^r$ | |
| $\xrightarrow{\quad \hat{h}\|g^h \quad}$ | |
| | Query key table at index $g^h$ and get $x_i$ |
| | $\hat{s} \leftarrow \left(\hat{h}\right)^{x_i}$ |
| $\xleftarrow{\quad \hat{s}\|g_1\|g_2 \quad}$ | |
| $s \leftarrow \hat{s} \cdot y_1^{-r}$ | |
| $v_1 \leftarrow e(s, g_2), v_2 \leftarrow e(h, y_2)$ | |
| If $v_1 \neq v_2$ then ret $\perp$ | |
| Else ret $k \leftarrow H(s)$ | |

Fig. 5

METHOD FOR RE-KEYING AN ENCRYPTED DATA FILE

CROSS REFERENCE TO RELATED APPLICATIONS

This application is a U.S. National Stage Application under 35 U.S.C. § 371 of International Application No. PCT/EP2015/079006 filed on Dec. 8, 2015. The International Application was published in English on Jun. 15, 2017 as WO 2017/097344 A1 under PCT Article 21(2).

FIELD

The present invention relates to a method for re-keying an encrypted data file. The present invention further relates to a system for re-keying an encrypted data file. The present invention even further relates to a method, performed on an assist server for re-keying an encrypted data file. The present invention even further relates to a non-transitory computer readable medium storing a program causing a computer to execute a method for re-keying an encrypted data file.

BACKGROUND

Cloud storage is receiving increasing attention and importance recently, since the cloud offers users a cost-effective, convenient, and highly available storage service. Conventional clouds rely on cost effective techniques such as data compression and data deduplication in order to save storage costs. While data deduplication is beneficial as it considerably reduces the cost of storage, cloud users do not really benefit from this technique, since deduplication is typically performed by the cloud itself.

Conventional methods and systems, e.g. disclosed in the non patent literature of Mihir Bellare and Sriram Keelveedhi, Thomas Ristenpart, DupLESS: Server-Aided Encryption for Deduplicated Storage, Proceedings of Usenix Security 2013 or in the non-patent literature of Frederik Armknecht, Jens-Matthias Bohli, Ghassan Karame, Franck Youssef, Transparent Data Deduplication in the Cloud, In Proceedings of the ACM Conference on Computer and Communications Security (ACM CCS), (to appear) 2015 focus on techniques for performing deduplication over encrypted data or focus on the constructing proof of ownership to attest that a user indeed possesses a file which is deduplicated.

In detail conventional methods and systems for performing deduplication are mainly based on convergent encryption. Here, chunks are encrypted deterministically, using the hash of the chunk as an encryption key. It is known that convergent encryption is vulnerable to brute-force attacks, and can only achieve semantic security for unpredictable messages. If the adversary can guess the content of a chunk, then he can simply decrypt the chunk (since the encryption key is the chunk hash). This also offers an advantage for the adversary: i.e., the adversary is able to say that some ciphertext is or is not an encryption of corresponding plaintext.

To address this vulnerability, the conventional methods and systems disclosed in the non-patent literature of Mihir Bellare and Sriram Keelveedhi, Thomas Ristenpart, DupLESS: Server-Aided Encryption for Deduplicated Storage, Proceedings of Usenix Security 2013 and of Frederik Armknecht, Jens-Matthias Bohli, Ghassan Karame, Franck Youssef, Transparent Data Deduplication in the Cloud, In Proceedings of the ACM Conference on Computer and Communications Security (ACM CCS), (to appear) 2015 use server-aided message locked encryption (MLE). These conventional methods and systems rely on a dedicated key server to generate key for a message based on not only the message's content, but also based on the global key server secret that is independent of the message content and should be extremely hard to guess. This makes the resulting encryption semantically secure with respect to the cloud storage provider, who is storing the data. From the perspective of a proxy which can be queried by clients to assist them in deriving in an oblivious way a strong encryption keys for content to be deduplicated these schemes offer semantic security for unpredictable messages and convergent encryption security for predictable ones.

Both these schemes rely on an oblivious pseudo-random function (OPRF) to blind the hash sent by users; this prevents the key server to learn any information about the hash of the file to be stored by users.

However, conventional methods and systems do not do not address re-keying, in particular do not allow for efficient re-keying of already encrypted and deduplicated data Re-keying enables a minimization of information leakage, in case the key is leaked. Further re-keying enables to revoke access to the company network of malicious employees for instance, or employees who quit a company, thus security is increased. Re-keying by re-encrypting in case of a large data volume in such a case would simply be impractical due to time needed for decryption and re-encryption.

SUMMARY

In an embodiment, the present invention provides a method for re-keying an encrypted data file, the data file being stored chunkwise on a storage entity (SE), data file chunks being encrypted with a global secret, and the method being performed in a memory available to a computing device. The method includes partially updating a global secret for encryption data for a data chunk to be re-keyed such that an output of a non-interactive oblivious key exchange is used to identify the private key of the data chunk to be re-keyed with a new private key; and reencrypting the data chunk to be re-keyed with the updated global secret.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5 shows part of steps of a method according to a further embodiment of the present invention;

DETAILED DESCRIPTION

Figure 1:
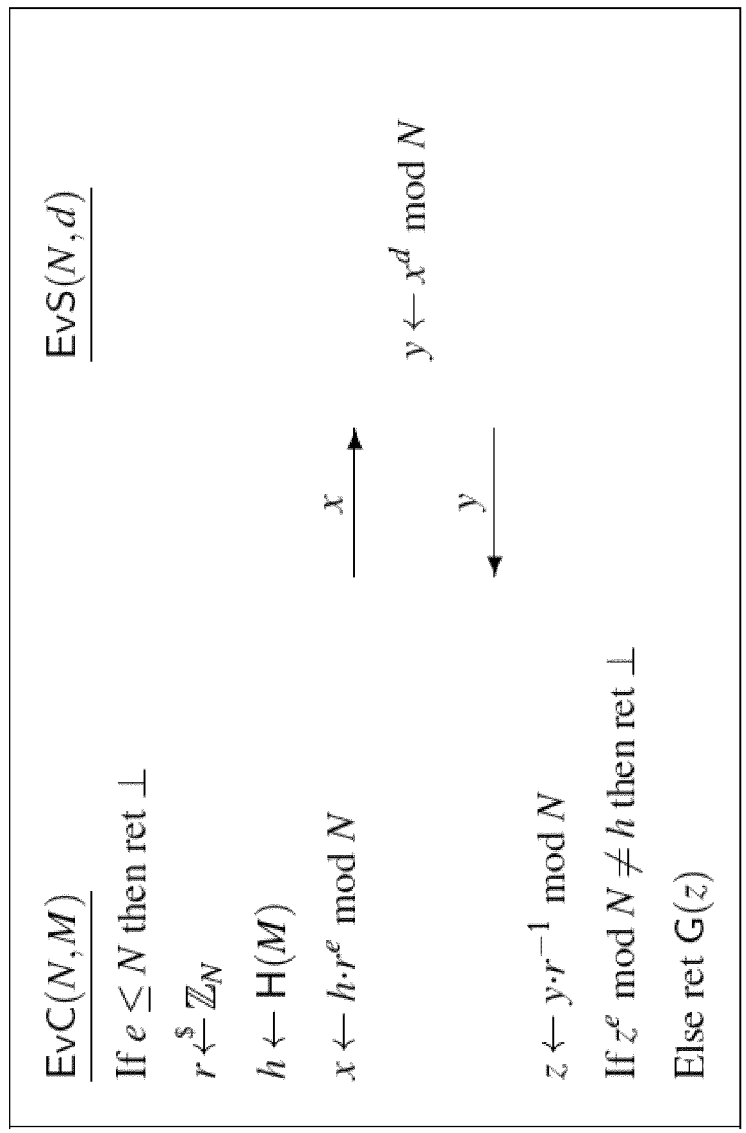
FIG. 1 shows a conventional key generation scheme.

Embodiments of the present invention provide for re-keying, which can be easily implemented while enabling efficient re-keying of encrypted data.

Although applicable in general to any kind of encrypted data files, embodiments of the present invention will be described with regard to re-keying of encrypted deduplicated data.

Although applicable in general to any kind of storage, embodiments of the present invention will be described with regard to cloud storage.

In an embodiment, the present invention provides a method for re-keying an encrypted data file, said data file being stored chunkwise on a storage entity, 'SE', said data file chunks being encrypted with a global secret, wherein said method performed in a memory available to a computing device, a wherein a global secret for encryption data is partially updated for a data chunk to be re-keyed such that the output of a non-interactive oblivious key exchange is used to identify the private key of said chunk to be replaced with a new private key and wherein said data chunk to be re-keyed is reencrypted with said updated global secret.

In a further embodiment, the present invention provides a system for re-keying an encrypted data file, comprising one or more clients, 'C', a storage entity, 'SE', and an assist server, 'AS', wherein said SE is adapted to store a data file being chunkwise, wherein said C is adapted to request re-keying of an with a global secret encrypted data file chunk, and to reencrypt said data chunk with said updated global secret said AS being adapted to partially update a global secret for encryption for said data chunk to be re-keyed, such that the output of a non-interactive oblivious key exchange is used to identify the private key of said chunk to be replaced with a new private key.

In a further embodiment, the present invention provides a method, performed on an assist server, 'AS', comprising the steps of Receiving a request for re-keying of a chunk of a data file from a client, 'C', Proving a global encryption key based on said chunk to be rekeyed, and Updating said encryption key for said chunk with a new encryption key, such that the output of a non-interactive oblivious key exchange with said C is used to identify the private key of said chunk to be replaced with a new private key, wherein the encryption key provided by the AS may be generated using an oblivious pseudo-random function based on a hash of said chunk and the generated chunk specific global encryption key.

In a further embodiment, the present invention provides a non-transitory computer readable medium storing a program causing a computer to execute a method for re-keying an encrypted data file, said data file being stored chunkwise on a storage entity, 'SE', said data file chunks being encrypted with a global secret, a wherein a global secret for encryption data is partially updated for a data chunk to be re-keyed such that the output of a non-interactive oblivious key exchange is used to identify the private key of said chunk to be replaced with a new private key and wherein said data chunk to be re-keyed is reencrypted with said updated global secret.

At least one of the embodiments has at least one of the following advantages: By only updating partially the global secret for the data to be re-keyed and locally reencrypting the data that should be re-keyed this ensures an easy implementation since no change of protocol-layer functionality on a key server is necessary. Further efficiency is enhanced since only the data that should be re-keyed is affected without incurring any need of awareness from the clients.

The term "computing device", or "computing entity", "client device", "client", "operator's device", "access device", "assist server", "storage entity", etc. refer in particular in the claims, preferably in the description each to a device adapted to perform computing like a personal computer, a tablet, a mobile phone, a server, or the like and comprises one or more processors having one or more cores and may be connectable to a memory for storing an application which is adapted to perform corresponding steps of one or more of the embodiments of the present invention. Any application may be software based and/or hardware based installed in the memory on which the processor(s) can work on. The computing devices, computing entities, etc. may be adapted in such a way that the corresponding steps to be computed are performed in an optimized way. For instance different steps may be performed in parallel with a single processor on different of its cores. Said devices, entities, etc. may each have one or more interfaces to communicate with the environment, e.g. other devices, humans, etc.

The term "computer readable medium" may refer to any kind of medium, which can be used together with a computation device or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM, EEPROM or the like.

Further features, advantages and further embodiments are described or may become apparent in the following:

Said global secret may be generated using an oblivious key generation protocol. This enhances further the security.

An updated global secret may be generated using an oblivious pseudo random function based on a hash value of said data chunk and said newly generated private key for said data chunk. This enables an easy implementation of an updated global secrete while being secure.

A client, 'C', may communicate with an assist server, 'AS', for key generation. This further enhances the security since the storage server is not included in the key generation process.

For exchanging key related information, a non-interactive oblivious key exchange protocol like a non-interactive Diffie-Hellman key exchange protocol may be used. This enables to hide the chunk hash efficiently from the assist server. Thus, security is increased.

Said C may compute the updated global secret for said data chunk using the hash value of authenticity information like a signature of said C and wherein said C may provide key index information and the AS may provide key information according to said key index information out of a number of pre-generated indexed private/public key pairs to said C. This enables a non-transparent re-keying for example by deriving by AS the signature of a received message and sending back a result to C who computes and verifies the unblended signature. The encryption key is computed for example as the hash value of the unblinded signature.

Said global secret may be partially updated by replacing an entry in a key share list, said entry being indexed by said output of said non interactive oblivious key exchange protocol with said new private key between said client and said AS This enables clients not to be aware of any re-keying, i.e. providing a transparent re-keying.

Said new private key may be randomly generated. This enables in an easy way to provide a new private random key.

Said hash value may be blinded. This ensures that the assist server or any other entity does not learn the hash value of the data chunk to be re-keyed.

Said AS may maintain said key share list. This enables that clients do not have to be aware of any re-keying.

Said hash value may be blinded by said C prior to sending it with authenticity information to said AS. Said AS checking the authenticity and providing the result of the checking to said C. This enables to provide a secret key only if the signature is correct.

A public key may be provided to the client via a trusted platform module connected to said client. This enhances the security since attacks where different clients do not share the same view on the existing server can be avoided. For example tamper resisting dongles or processor extensions to trusting computed can be used which store in read only memory public keys. These dongles, similar to trusted platform modules ensure that the public key never leaves the read only memory ROM and are also equipped with cryptographic procedures. The user then may have simply to invoke an application program interface of the tamper resisting dongle input the hash function and the dongle outputs the blinded public key.

FIG. 1 shows a conventional key generation scheme. In FIG. 1 an RSA key based generation scheme as disclosed in the non patent literature of Mihir Bellare and Sriram Keelveedhi, Thomas Ristenpart, DupLESS: Server-Aided Encryption for Deduplicated Storage, Proceedings of Usenix Security 2013 is shown.

Figure 2:
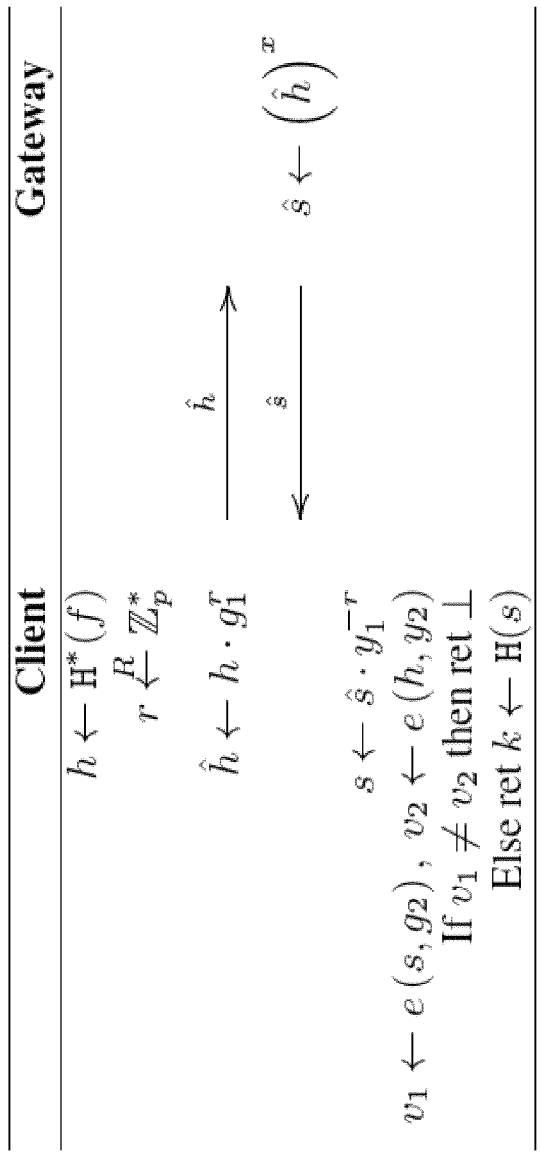
FIG. 2 shows a further conventional key generation scheme.

FIG. 2 shows a further conventional key generation scheme. In FIG. 2 a BLS-based key generation scheme as disclosed in the non patent literature of Frederik Armknecht, Jens-Matthias Bohli, Ghassan Karame, Franck Youssef, Transparent Data Deduplication in the Cloud, In Proceedings of the ACM Conference on Computer and Communications Security (ACM CCS), (to appear) 2015 is shown. A client hashes a file f and blinds it by multiplying it with $g_1^r$ given a randomly chosen $r \in \mathbb{Z}_p$ and sends a blinded hash $\hat{h}$ to the gateway. The gateway generates a signature as $\hat{s}$ using the blinded hash value and a secret key x in $\mathbb{Z}_p$ and sends it back to the client. The client computes the unblended signature s and verifies that $v_1$ equals $v_2$ and then the encryption key k is computed as the hash of the unblended signature H(s). e is a bilinear map of two groups $T_1$, $T_2$ of order p, $g_1$, $g_2$ are generators of $T_1$, $T_2$ respectively and $T_1 \times T_2 \to T_T$ is a paring function with the hash function: H: $\{0,1\}^* \to T_1$, the secret x in $\mathbb{Z}_p$ with corresponding public keys $y_1 = g_1^x$; $y_2 = g_2^x$.

Figure 3:
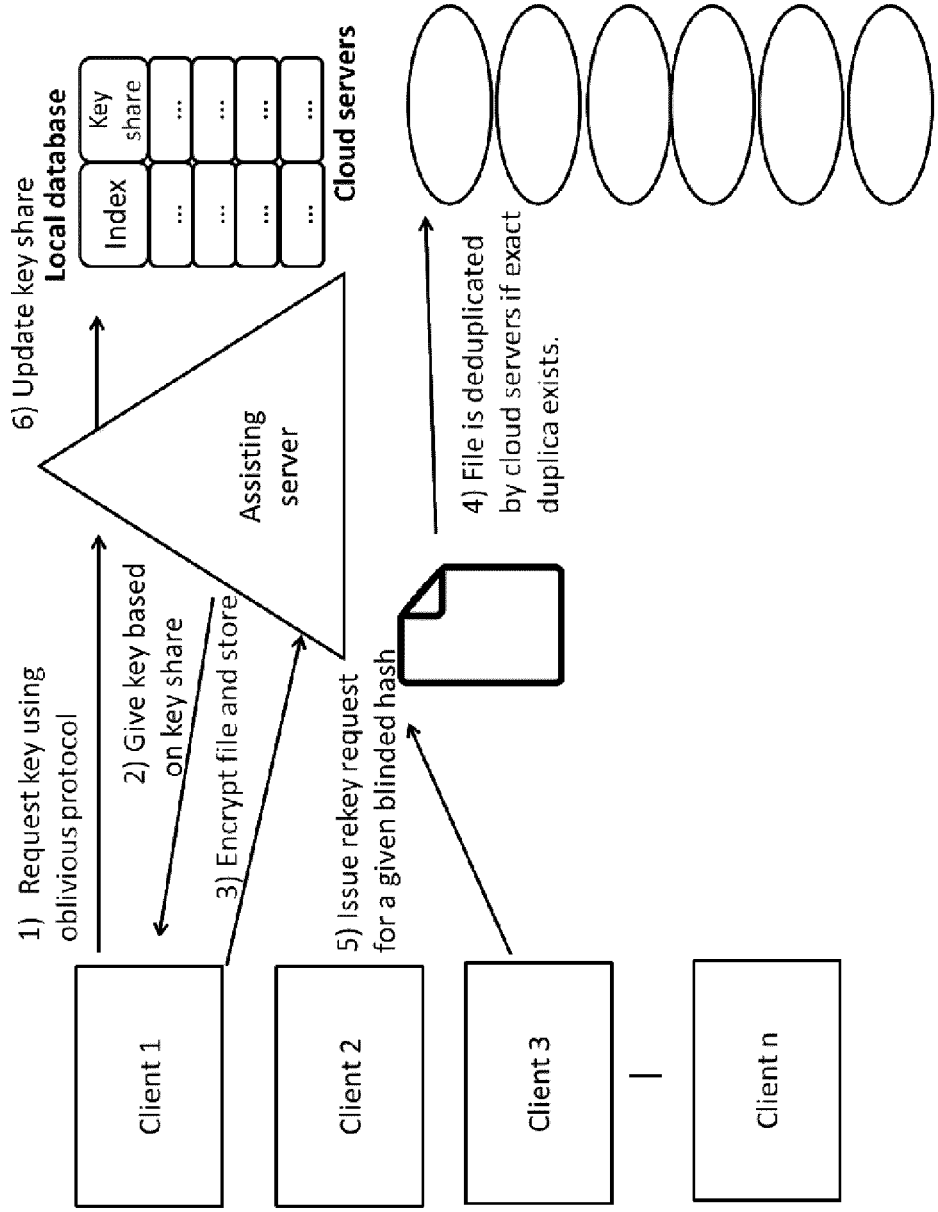
FIG. 3 shows a system according to an embodiment of the present invention.

FIG. 3 shows a system according to an embodiment of the present invention. In FIG. 3 a plurality of clients is shown. To store a file on cloud servers a client requests an encryption key using an oblivious protocol from an assisting server, for example by executing a non-interactive Diffie-Hellman key exchange protocol with the assisting server. The assisting server provides a key based on the corresponding key share for the file to be encrypted back to the client. The client then encrypts the file and stores it on a cloud server via the assisting server.

When then another client issues a request for re-keying for a given blinded hash based on the index output of the key exchange protocol with the key server here the assisting server and the assisting server determines that the re-keying request is authentic, the assisting server updates the global private key dedicated to the data chunk or file in question by updating the entry indexed by the output of the key exchange protocol with the new randomly generated private key in a local data base available to the assisting server. Then a server-aided key generation protocol between the client and the assisting server is executed to output the encryption key for the client, preferably using an oblivious pseudo-random function based on the file hash and the generated random global key specific to each chunk. The client then re-encrypts the file with the obtained encryption key, i.e. steps 1) to 3) are performed again, and then deletes the old copy for example.

Figure 4:
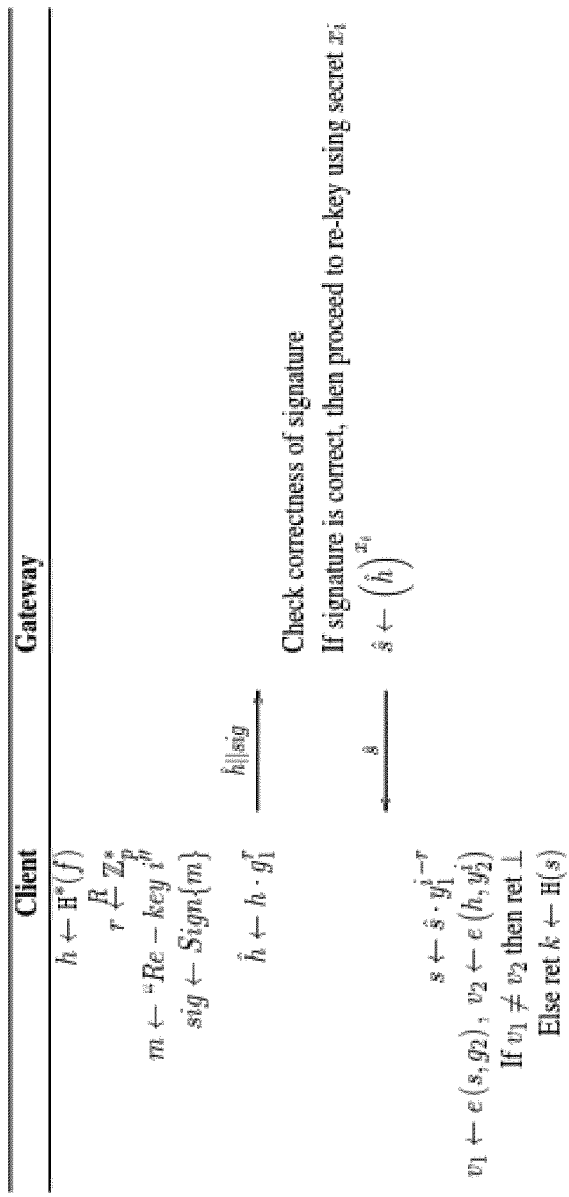
FIG. 4 shows part of steps of the method according of the further embodiment to the present invention.

FIG. 4 shows part of steps of the method according of the further embodiment to the present invention. In FIG. 4 the proxy/gateway/assisting server is assumed to choose two groups $\Gamma_1$ and $\Gamma_2$ with order p, and a computable bilinear map e: $\Gamma_1 \times \Gamma_2 \to \Gamma_T$. Additionally, the proxy chooses n private keys $x_1, \ldots, x_n \in \mathbb{Z}_p$, and their corresponding public keys $y_1^i = g_1^{x_i} \in \Gamma_1$ and $y_2^i = g_2^{x_i} \in \Gamma_2$. Let H*: $\{0, 1\}^* \to \Gamma_1$ be a cryptographic hash function which maps bitstrings of arbitrary length to group elements in $\Gamma_1$. Prior to storing a file or a chunk f, the client C computes $h \leftarrow H^*(f)$, blinds it by multiplying it with $g_1^r$, given a randomly chosen $r \in \mathbb{Z}_p$, and sends the blinded hash $\hat{h}$ to the gateway/proxy/assisting server. The assisting server derives the signature on the received message and sends the result back to the client C, who computes the unblinded signature s and verifies that: $e(s, g_2) = e(h^x g_1^{rx_i} g_1^{-rx_i}, g_2) = e(h, y_2^i)$. The encryption key is then computed as the hash of the unblinded signature: $k \leftarrow H(s)$. The properties of this embodiment are as follows:

The proxy/gateway/assisting server only keeps n keys, but does not have to keep track of which chunk has been re-keyed. Clients C have to be aware of that.

After a re-key request, the client should re-encrypt the old file with the new generated key, and delete it from S.

Here, only the chunks that should be re-keyed are affected. Deduplication may happen after that, as long as all clients are synchronized on how many re-key rounds have occurred for each chunk, preferably if there is a small number of chunks.

Thus FIG. 4 provides a non-transparent re-keying procedure using the oblivious protocol of the non-patent literature of Frederik Armknecht, Jens-Matthias Bohli, Ghassan Karame, Franck Youssef, Transparent Data Deduplication in the Cloud, In Proceedings of the ACM Conference on Computer and Communications Security (ACM CCS), (to appear) 2015.

FIG. 5 shows part of steps of the method according of the further embodiment to the present invention. The embodiment of FIG. 5 shows the use of the oblivious protocol with a non-interactive Diffie-Hellman protocol. All clients are assumed to know the public key of the proxy $y = g^x$. Moreover, the proxy is assumed to store locally a dedicated key table containing tuples of the form: INDEX|Key. At the start, this table is empty. When a client wants to get a key for a give file f, the client computes the file hash h and $y^h$, and sends it to the proxy. The latter checks that the key table. If the row at index $y^h$ is empty, then the proxy generates a new key $x_i$ at random and proceeds with the oblivious protocol as shown in FIG. 5. If, on the other hand, the row exists, then the proxy simply fetches $x_i$ and proceed. Any client can send a re-key request to any file/chunk. The client simply signs his request and includes the index $y^h$. The proxy checks that the signature is correct and that the client is authorized to ask for re-keying. If so, the proxy simply updates the row at index $y^h$ with a new randomly generated key.

The properties of the embodiment of FIG. 5 are inter alia as follows:

Clients do not have to be aware of any re-keying attempt. They just contact the proxy, get the key and decrypt the file.

After a re-key request, the owner should re-encrypt the old file with the new generated key, and delete it from S.

Here, only the chunks that should be re-keyed are affected. Deduplication may happen after that, as long as all clients are synchronized on how many re-key rounds have occurred for each chunk.

This embodiment enables scaling with the number of clients.

This embodiment enables non-leakage of h to the proxy, i.e. it is infeasible for the proxy to compute the discrete logarithm xh of $y^h=g^{xh}$. This ensures that the proxy never learns h in the process.

Figure 6:
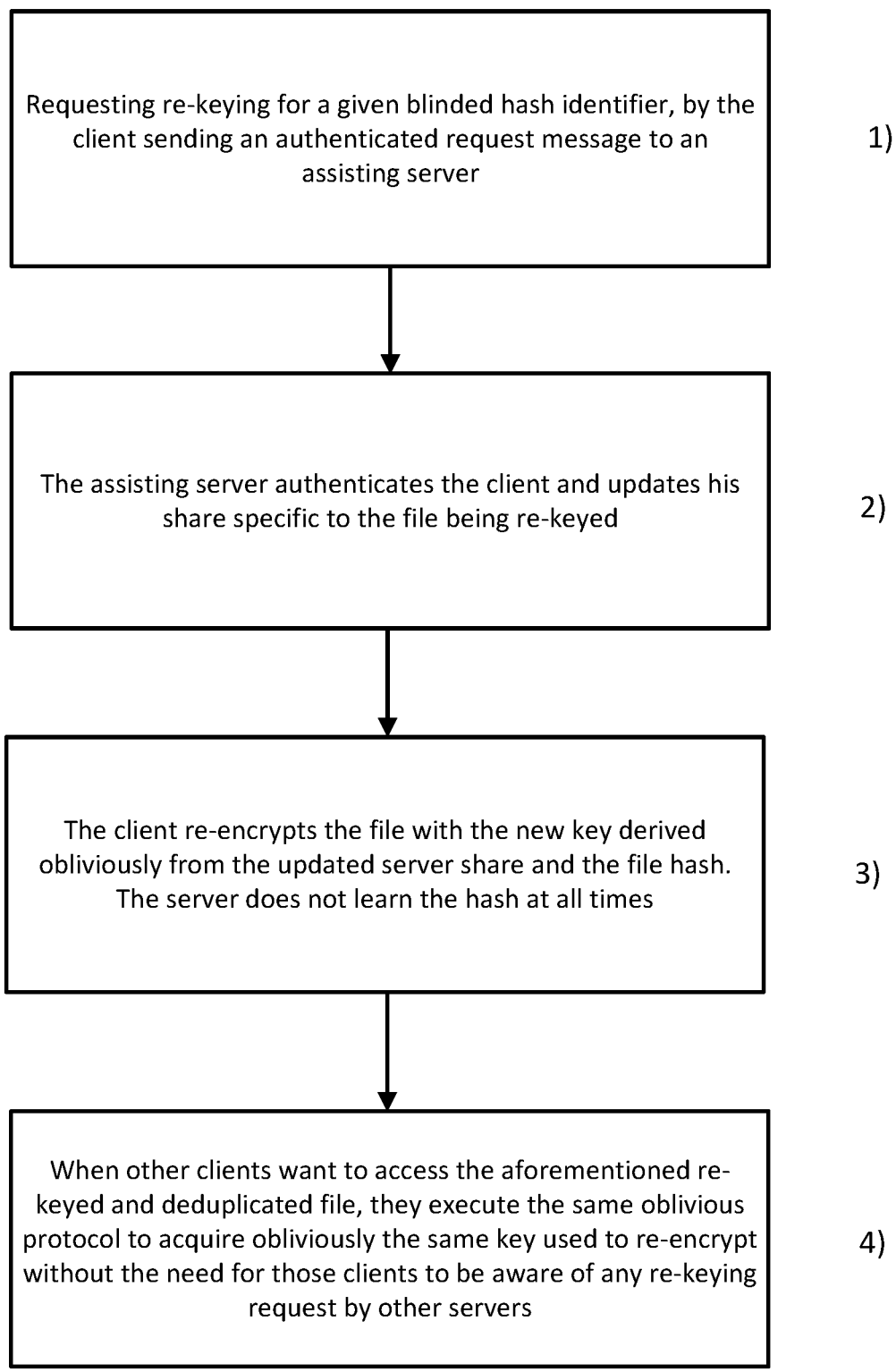
FIG. 6 shows part of steps of a method according to a further embodiment of the present invention.

FIG. 6 shows part of steps of the method according of the further embodiment to the present invention. In FIG. 6 a method for re-keying is shown comprising the steps of:

Requesting re-keying for a given blinded hash identifier, by the client sending an authenticated request message to an assisting server.

The assisting server authenticates the client and updates his share specific to the file being re-keyed.

The client re-encrypts the file with the new key derived obliviously from the updated server share and the file hash. The server does not learn the hash at all times.

When other clients want to access the aforementioned re-keyed and deduplicated file, they execute the same oblivious protocol to acquire obliviously the same key used to re-encrypt without the need for those clients to be aware of any re-keying request by other servers.

Figure 7:
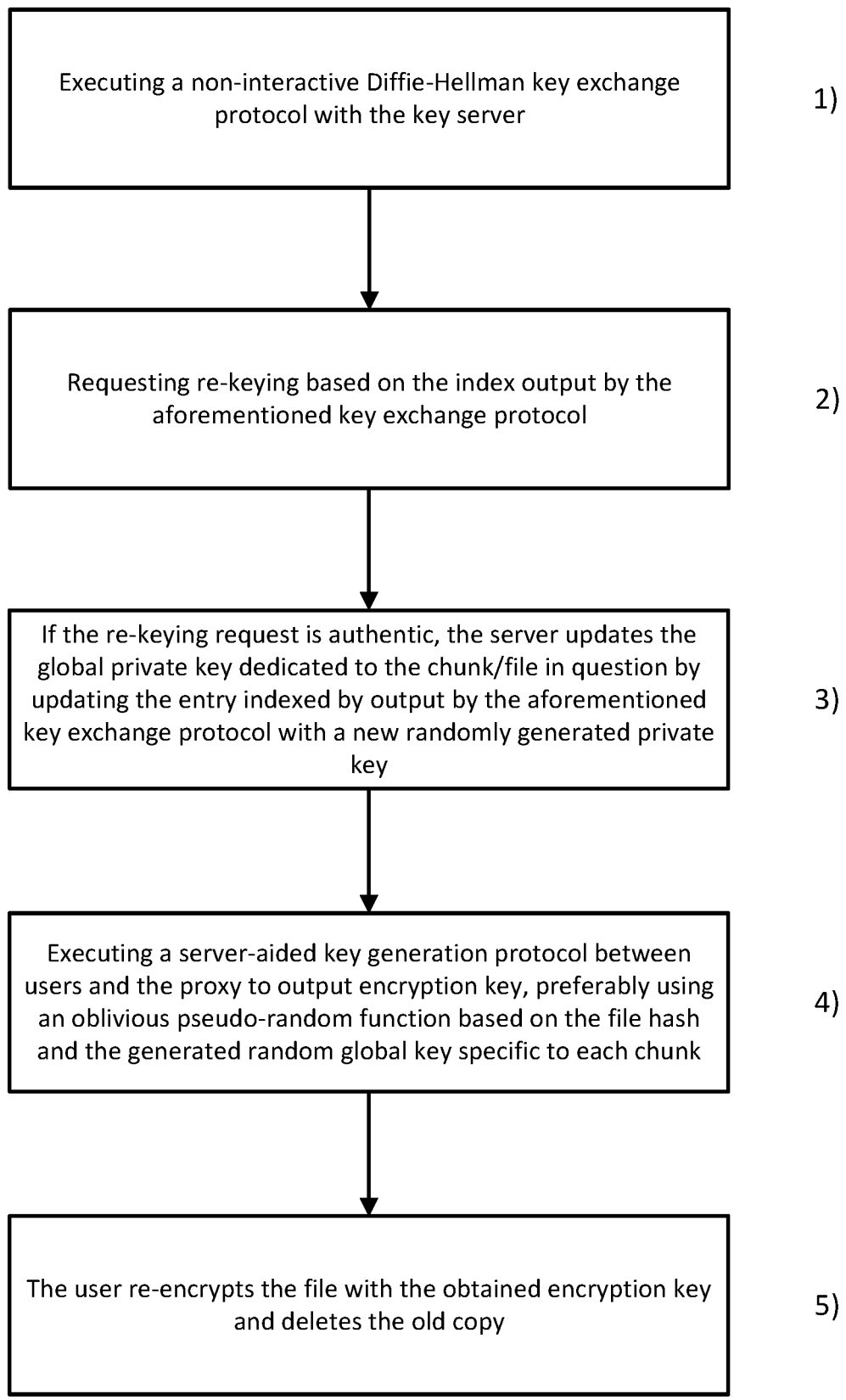
FIG. 7 shows part of steps of a method according to a further embodiment of the present invention.

FIG. 7 shows part of steps of the method according of the further embodiment to the present invention. In FIG. 7 a method for re-keying is shown comprising the steps of:

Executing a non-interactive Diffie-Hellman key exchange protocol with the key server Requesting re-keying based on the index output by the aforementioned key exchange protocol.

If the re-keying request is authentic, the server updates the global private key dedicated to the chunk/file in question by updating the entry indexed by output by the aforementioned key exchange protocol with a new randomly generated private key.

Executing a server-aided key generation protocol between users and the proxy to output encryption key, preferably using an oblivious pseudo-random function based on the file hash and the generated random global key specific to each chunk.

The user re-encrypts the file with the obtained encryption key and deletes the old copy.

In the above embodiments a number of clients that are interesting in storing their files at a storage provider S are provided. Further said storage provider S exposes to its clients a standard interface comprising a number of simple operations, such as storing a file, retrieving a file, deleting a file, generating a URL for sending HTTP commands for storage/retrieval, etc.

Further a proxy is provided which can be queried by clients to assist them in deriving in an oblivious way strong encryption keys for content to be deduplicated. S is assumed to deduplicate all exactly similar chunks that are stored by different users.

Said proxy P acts as an assisting key server. Inter alia proxy P helps clients derive a strong encryption key to encrypt content in such a way that clients encrypting the same file will end up generating the same key.

The clients and the proxy P are assumed to share per-user keys and credentials (e.g. client certificates). In particular, all communication between a client and the proxy is authenticated and, in the case of need, encrypted based on a secure encryption algorithm Enc and a cryptographic hash function H.

In one or more of the aforementioned embodiments the same public key of the server is assumed to be available to all clients. To avoid any attack where different clients do not share the same view on the server key, trusted computing principles can be used. For example, tamper resistant dongles (or processor extensions to trusted computing) can be used, which store in read only memory (ROM) the public key $g^s$. These dongles, similar to trusted platform modules (TPMs), ensure that the public key $g^s$ never leaves ROM and also are equipped with cryptographic algorithms. The user simply has to invoke an API of the dongle, inputting the hash function, and the output would be $g^{sh}$.

In summary embodiments of the present invention provide for re-keying by only updating partially the global secret of the key server for the data to be re-keyed, and locally re-encrypting on the storage entity the data that should be re-keyed. This ensures no change of protocol-layer functionality on the key server, but supports re-keying.

Embodiments of the present invention further enable indexing of global keys used to assist a chunk-based deduplication files based on the output of a non-interactive Diffie-Hellman protocol hiding the file hash. Even further the present invention enables an easy implementation such that can be used with existing oblivious based server assisted encrypted deduplication techniques.

At least one embodiment of the present invention has at least one of the following advantages: High security is enabled as well as high efficiency since only deduplicated data that should be re-keyed is affected without incurring any need of awareness from a client. The present invention enables therefore an efficient re-keying of encrypted deduplicated data such that information leakage in case the key is leaked is minimized and access of malicious employees for example can be revoked.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for re-keying an encrypted data file, the data file being stored chunkwise on a storage entity (SE), data file chunks being encrypted with a global secret, and the method being performed by one or more computing devices, the method comprising:

updating the global secret for encryption data for a data chunk to be re-keyed such that an output of a non-interactive oblivious key exchange is used to identify a private key of the data chunk to be re-keyed with a new private key, wherein updating the global secret comprises generating an updated global secret using an oblivious pseudo random function based on a hash value of the data chunk to be re-keyed and the new private key for the data chunk to be re-keyed; and reencrypting the data chunk to be re-keyed with the updated global secret.

2. The method according to claim 1, wherein the global secret is generated using an oblivious key generation protocol.

3. The method according to claim 1, wherein a client (C) communicates with an assist server (AS) for key generation.

4. The method according to claim 1, wherein the non-interactive oblivious key exchange is used for exchanging key related information.

5. The method according to claim 3, wherein the C generates the updated global secret for the data chunk to be re-keyed, wherein the hash value is a hash value associated with a signature of the C, and wherein the C provides key index information and the AS provides key information of a number of pre-generated private/public key pairs to the C.

6. The method according to claim 3, wherein updating the global secret further comprises updating the global secret by replacing an entry in a key share list, the entry being indexed by the output of the non-interactive oblivious key exchange with the new private key between the client and the AS.

7. The method according to claim 5, wherein the new private key is randomly generated.

8. The method according to claim 1, wherein the hash value is blinded.

9. The method according to claim 6, wherein the AS maintains the key share list.

10. The method according to claim 6, wherein the hash value is blinded by the C prior to sending it together with authenticity information to the AS, the AS checking the authenticity and providing the result of the checking to the C.

11. The method according to claim 1, wherein a public key is provided to a client via a trusted platform module connected to the client.

12. A system for re-keying an encrypted data file, comprising a client (C),
a storage entity (SE), and
an assist server (AS), wherein the SE is adapted to store a data file being chunkwise, wherein the C is adapted to request re-keying of a data file chunk encrypted with a global secret and to reencrypt the data chunk with an updated global secret, and wherein the AS is adapted to update the global secret for encryption for the data chunk to be re-keyed, such that an output of a non-interactive oblivious key exchange is used to identify a private key of the chunk to be re-keyed with a new private key, wherein the AS is adapted to update the global secret by generating the updated global secret using an oblivious pseudo random function based on a hash value of the data chunk to be re-keyed and the new private key for the data chunk to be re-keyed.

13. A method, performed on an assist server (AS), comprising:

receiving a request for re-keying a chunk of a data file from a client (C);

proving a global encryption key based on the chunk to be rekeyed; and updating the encryption key for the chunk with a new encryption key, such that an output of a non-interactive oblivious key exchange with the C is used to identify a private key of the chunk to be replaced with a new private key, wherein the non-interactive oblivious key exchange is an oblivious protocol, wherein the encryption key provided by the AS is generated using an oblivious pseudo-random function based on a hash of the chunk and the generated chunk specific global encryption key.

14. A non-transitory computer readable medium storing a program causing a computer to execute a method for re-keying an encrypted data file, the data file being stored chunkwise on a storage entity (SE), data file chunks being encrypted with a global secret, the method comprising:

updating the global secret for encryption data for a data chunk to be re-keyed such that an output of a non-interactive oblivious key exchange is used to identify a private key of the chunk to be re-keyed with a new private key, wherein updating the global secret comprises generating an updated global secret using an oblivious pseudo random function based on a hash value of the data chunk to be re-keyed and the new private key for the data chunk to be re-keyed; and reencrypting the data chunk to be re-keyed with the updated global secret.

15. The method according to claim 4, wherein the non-interactive oblivious key exchange uses a Diffie-Hillman key exchange protocol.

* * * * *